(No Model.)

J. W. HOPKINS.
ROTARY WATER METER.

No. 355,821. Patented Jan. 11, 1887.

Witnesses
Harold Serrell
Chas. H. Smith

Inventor
Joseph W. Hopkins
by Lemuel W. Serrell
atty

UNITED STATES PATENT OFFICE.

JOSEPH W. HOPKINS, OF BROOKLYN, NEW YORK, ASSIGNOR TO HIMSELF AND GEORGE W. HOPKINS, OF SAME PLACE.

ROTARY WATER-METER.

SPECIFICATION forming part of Letters Patent No. 355,821, dated January 11, 1887.

Application filed June 8, 1886. Serial No. 204,441. (No model.)

*To all whom it may concern:*

Be it known that I, JOSEPH W. HOPKINS, of Brooklyn, in the county of Kings and State of New York, have invented a new and useful Improvement in Water-Meters, and the following is declared to be a description of the same.

A meter has heretofore been made with flexible pistons connected into a ring within an inclosing-case, and having inlet and outlet passages for the water to move the ring of pistons and turn a registering mechanism.

My invention relates to meters for water and other fluids, and the same consists of a circular casing having inlet and outlet passages and a circular channel containing a range of balls that receive motion from the water as it passes from the inlet to the outlet passage. These spheres or balls are moved one at a time by the water, and the registering-wheel is revolved by the balls coming in contact with its notched periphery.

Figure 2:
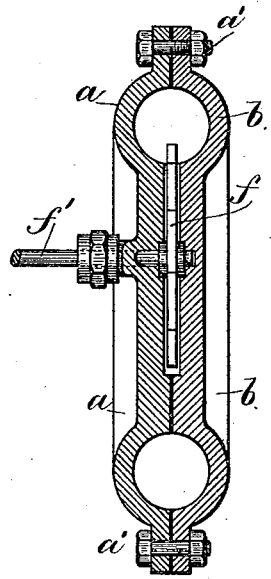
Figure 1:
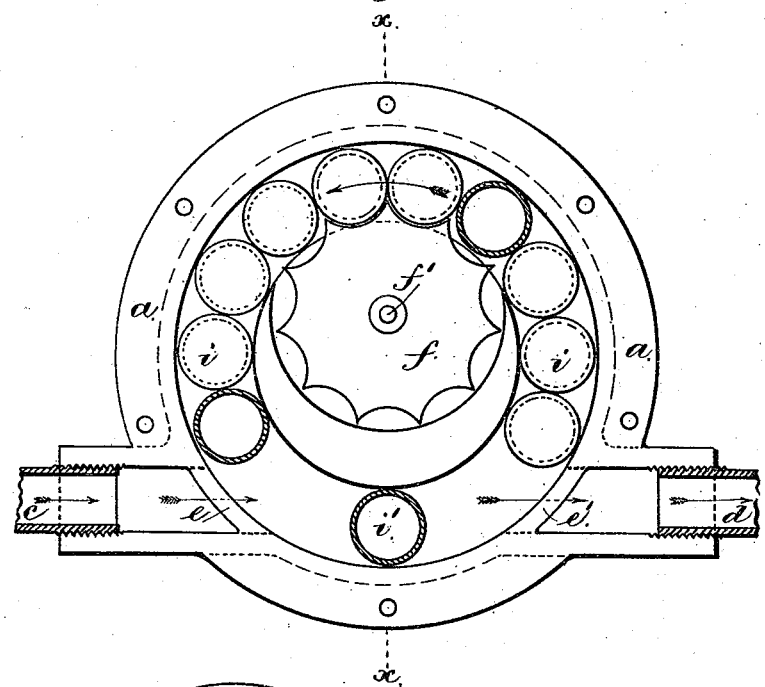
Figure 3:
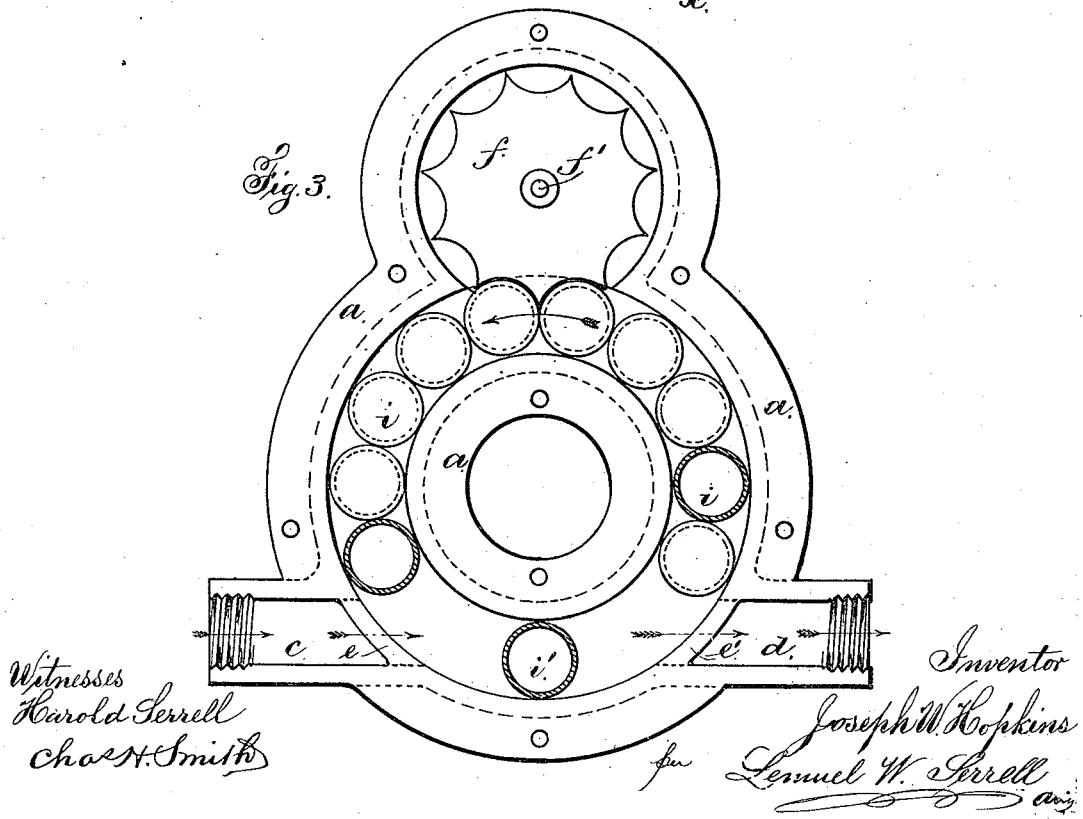

In the drawings, Figure 1 is a plan of my improved meter with one-half of the case removed. Fig. 2 is a cross-section of the meter at the line $x\ x$, and Fig. 3 is a plan of a modification of my improved meter.

There are half-casings $a$ and $b$, having circular channels and flanges around their outer edges, through which flanges bolts $a'$ are passed to hold the cases together, and the channels are semicircular in cross-section, so as to form a circular channel when the cases are secured together, and there is an inlet-pipe, $c$, and exit-pipe $d$, nearly in line with the circular channel at one side of the case, and across the mouths of said inlet and outlet pipes are bridge-pieces $e\ e'$.

There is a disk of metal, $f$, mounted upon an axle, $f'$, and provided with notches upon its periphery, and said disk $f$ is free to be revolved upon its axis between the cases $a\ b$, and the shaft $f'$ of said disk is connected in any desired manner to a train of gearing and indicating-hand over a dial that will show the amount of fluid passing through the meter.

There are a number of balls or hollow metal spheres, $i$, within the circular channel, between the cases $a$ and $b$, and filling up the greater part of said channel between the edges of the inlet and exit pipes, and one or more balls are in the passage between the inlet and delivery pipes.

The water moving in the direction of the arrow operates upon the balls in the channel between the inlet and exit pipe and forces them along said channel with sufficient power to strike against the row of balls in the channel and move them all, and the ball which is nearest the inlet-pipe passes into the water-channel, to be operated upon in the manner before described. Thus the mass of balls is kept continually moving while the water is running, and in their movement they operate the notched disk $f$ and shaft $f'$ to record the quantity of water passing through the meter.

The notches in the periphery of disk $f$ are of a size to fit the balls, so that there is no lost motion or concussion.

In Fig. 1 the wheel or disk $f$ is shown as inside the circular channel containing the balls, and in Fig. 3 it is outside the same, the operations being alike.

I claim as my invention—

1. The herein-described water-meter, composed of the circular cases $a\ b$, connected together and each having a circular channel semicircular in cross-section, and the inlet and exit water-ways in line with each other upon one side of the case, in combination with the spheres or balls $i\ i'$ within said circular channel, and a registering wheel or disk, $f$, having notches upon its periphery, into which the balls fit, substantially as specified.

2. The herein-described water-meter, composed of the circular cases $a\ b$, connected together and each having a circular channel semicircular in cross-section, and the inlet and exit water-ways in line with each other upon one side of the case, in combination with the spheres or balls $i\ i'$ within said circular channel, and a registering wheel or disk, $f$, having notches upon its periphery, into which the balls fit, and the bridge-pieces $e\ e'$ across the mouths of the inlet and exit pipes, substantially as and for the purposes specified.

Signed by me this 5th day of June, A. D. 1886.

JOSEPH W. HOPKINS.

Witnesses:
GEO. T. PINCKNEY,
HAROLD SERRELL.